(12) United States Patent
Koshiyama et al.

(10) Patent No.: US 8,978,725 B2
(45) Date of Patent: Mar. 17, 2015

(54) BICYCLE WHEEL RIM STRUCTURE

(75) Inventors: Kazuki Koshiyama, Osaka (JP); Hiroshi Fujita, Osaka (JP); Takashi Yaegashi, Osaka (JP)

(73) Assignee: Shimano Inc., Osaka (JP)

( * ) Notice: Subject to any disclaimer, the term of this patent is extended or adjusted under 35 U.S.C. 154(b) by 374 days.

(21) Appl. No.: 13/277,698

(22) Filed: Oct. 20, 2011

(65) Prior Publication Data

US 2013/0099556 A1 Apr. 25, 2013

(51) Int. Cl.
*B60B 21/12* (2006.01)
*B60B 21/02* (2006.01)
*B60B 21/06* (2006.01)
*B60B 1/04* (2006.01)

(52) U.S. Cl.
CPC ............ *B60B 21/025* (2013.01); *B60B 21/062* (2013.01); *B60B 21/12* (2013.01); *B60B 21/125* (2013.01); *B60B 1/041* (2013.01); *B60B 1/044* (2013.01); *B60B 21/026* (2013.01); *B60B 2900/112* (2013.01); *B60B 2900/115* (2013.01); *Y10S 152/16* (2013.01)
USPC ............. 152/381.5; 152/DIG. 16; 301/95.104

(58) Field of Classification Search
CPC ...................................................... B60B 21/12
USPC ................... 152/379.4, 381.5, 381.6, DIG. 9, 152/DIG. 16; 301/95.102, 95.104, 95.11
See application file for complete search history.

(56) References Cited

U.S. PATENT DOCUMENTS

| | | | |
|---|---|---|---|
| 2,937,905 A * | 5/1960 | Altenburger | 301/58 |
| 5,538,058 A * | 7/1996 | Aloy | 152/381.5 |
| 6,155,651 A | 12/2000 | Mizata et al. | |
| 7,104,300 B2 * | 9/2006 | Veux et al. | 152/379.4 |
| 7,374,250 B2 * | 5/2008 | Fioravanti | 301/58 |
| 7,445,034 B1 | 11/2008 | Huang | |
| 2004/0095014 A1 | 5/2004 | Veux et al. | |
| 2004/0262982 A1 | 12/2004 | Varrone | |
| 2005/0189813 A1 * | 9/2005 | Bauer | 301/95.104 |
| 2005/0210675 A1 * | 9/2005 | Price et al. | 29/894.31 |
| 2006/0108041 A1 * | 5/2006 | Schelhaas | 152/381.6 |
| 2007/0029869 A1 | 2/2007 | Senoo | |

FOREIGN PATENT DOCUMENTS

| | | |
|---|---|---|
| DE | 102004003873 A1 | 8/2005 |
| DE | 20 2007 010 082 U1 | 3/2008 |

(Continued)

OTHER PUBLICATIONS

European Search Report of corresponding EP Application No. 12 16 9429.3 dated Feb. 11, 2013.

*Primary Examiner* — Kip T Kotter
(74) *Attorney, Agent, or Firm* — Global IP Counselors

(57) ABSTRACT

A bicycle wheel rim structure is provided with a rim, a cap and a tape. The rim includes a first annular side portion, a second annular side portion and an annular bridge portion extending between the first and second annular side portions. The bridge portion has at least one opening. The cap includes a base plate and a projection. The base plate overlies an outer rim surface of the annular bridge portion. The projection extends from the base plate into the at least one opening. The tape is attached to the outer rim surface of the annular bridge portion and overlying the base plate of the cap. The tape is dimensioned to cover an interface between a peripheral edge of the base plate of the cap and the outer rim surface of the annular bridge portion.

14 Claims, 7 Drawing Sheets

(56) References Cited

FOREIGN PATENT DOCUMENTS

| WO | 03/026905 | A1 | | 4/2003 |
|----|-----------|----|---|--------|
| WO | 2009/036491 | A1 | | 3/2009 |
| WO | WO 2009036491 | A1 | * | 3/2009 |

* cited by examiner

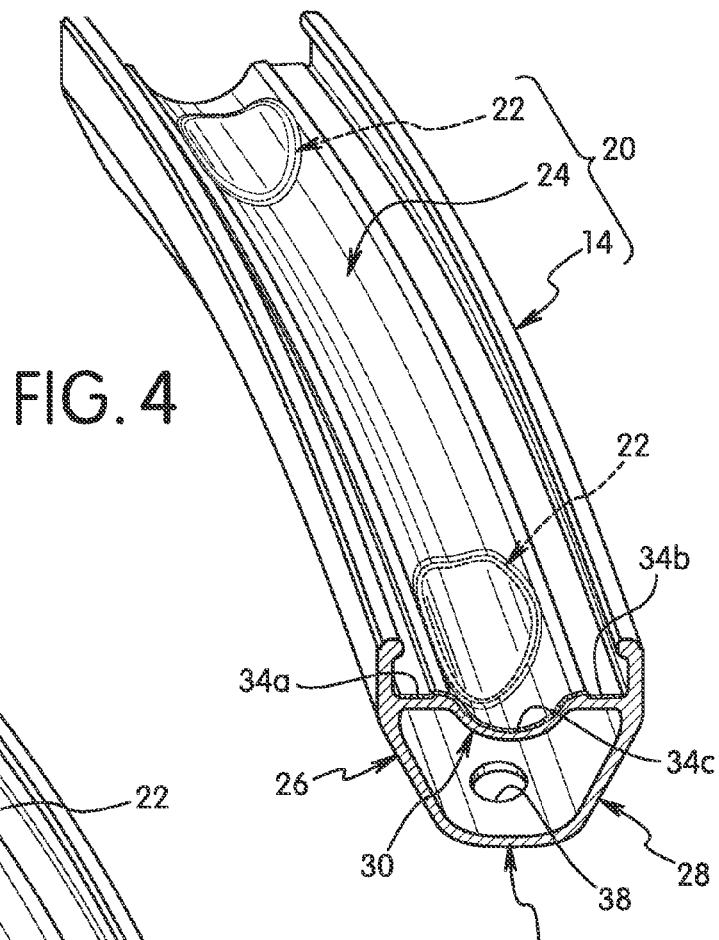
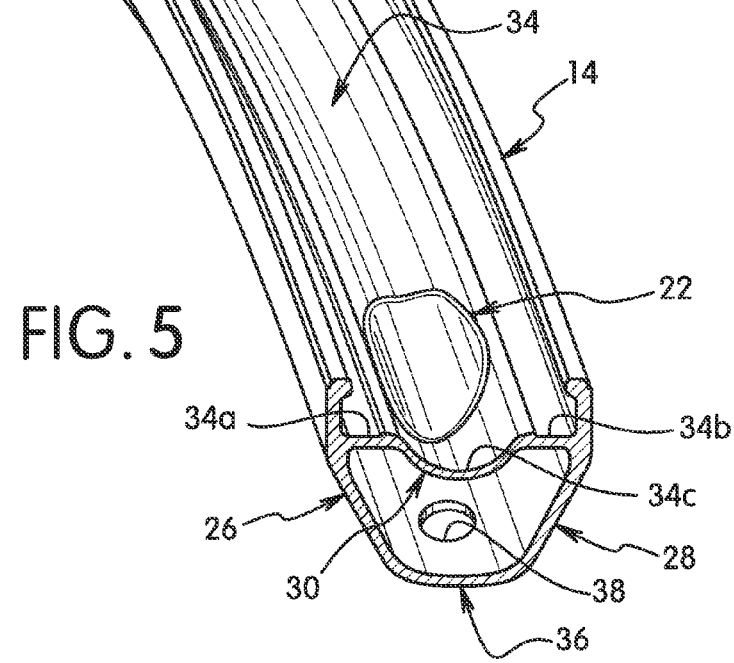

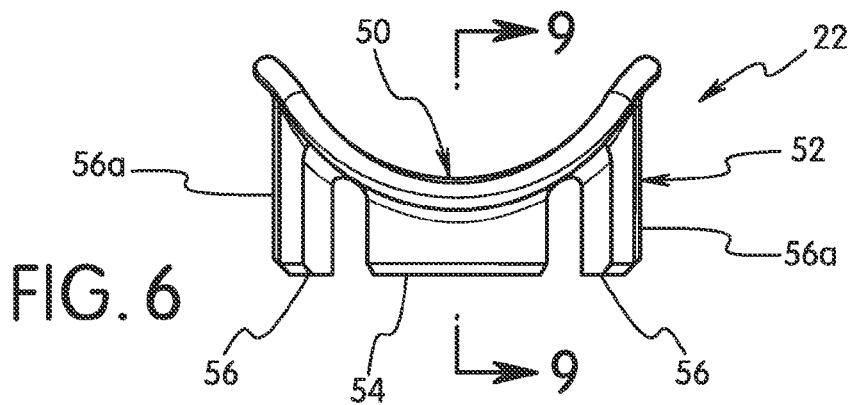
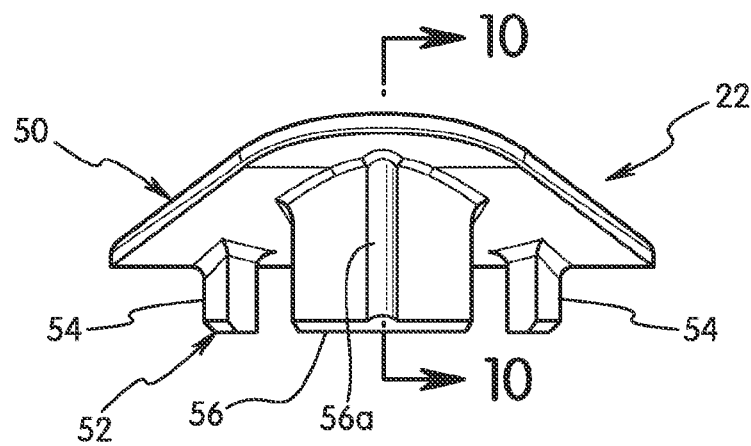
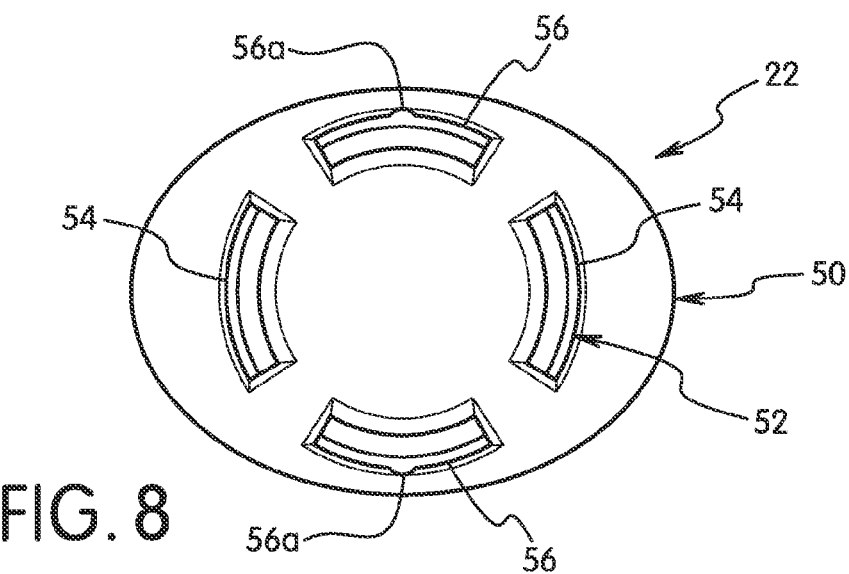

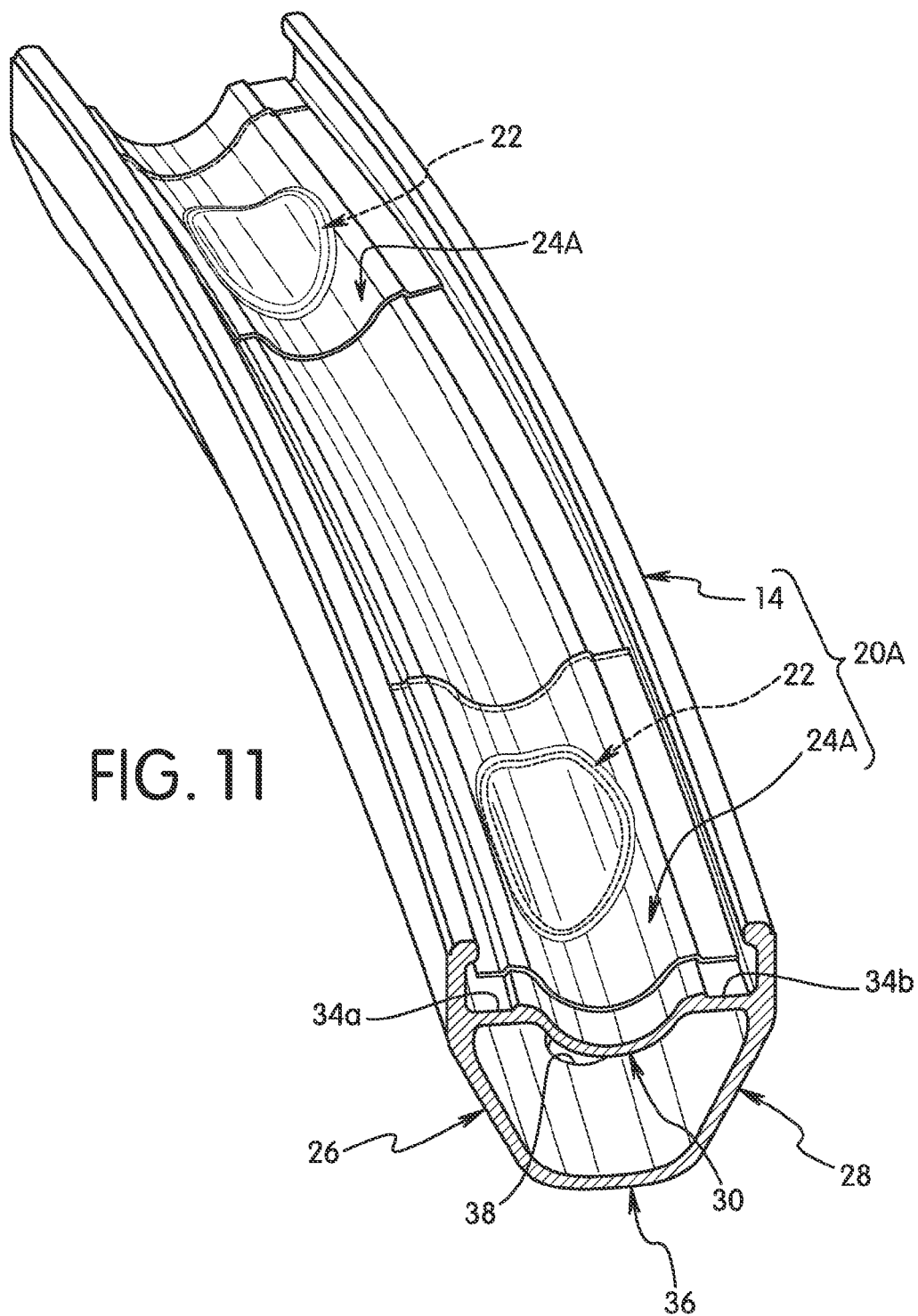

BICYCLE WHEEL RIM STRUCTURE

BACKGROUND

1. Field of the Invention

This invention generally relates to a bicycle wheel rim structure. More specifically, the present invention relates a bicycle wheel rim structure in which openings in an outer bridge portion of a bicycle wheel rim are covered such that a tubeless pneumatic tire can be used.

2. Background Information

There are many different types of bicycle wheels, which are currently available on the market. Most bicycle wheels include a hub, a plurality of spokes and an annular rim. The hub is rotatably mounted to a part of the bicycle frame. The inner end of each spoke is connected to the hub and the spokes extend outward from the hub. The annular rim is connected to the outer ends of the spokes and includes an outer circumferential part that supports a pneumatic tire. Typically, the spokes of the bicycle wheel are thin metal wire spokes. The ends of the hub are each provided with a flange that is used to couple the spokes to the hub. In particular, holes are provided in the hub flanges. The wire spokes are usually provided with a flange that is formed in the shape of a nail head. The inner end is supported in one of the holes in one of the hub flanges. The outer ends of the spokes typically are provided with threads for engaging spoke nipples, which secure the outer ends of the wire spokes to the rim. In particular, the spoke nipples have flanges, which engage an interior surface of the rim. Alternatively, the spokes may be reversed, with the outer end having the nail head and the inner end having the threads for engaging spoke nipples, which secure the inner ends of the wire spokes to the hub. In any case, an outer bridge portion of the rim is typically provided with a plurality of spoke access openings for installing the spokes to the rim. In some cases, the spoke access openings have sharp edges which can puncture a pneumatic tire tube. Thus, a hole stopper is sometimes provided in each of the spoke access openings thr protecting the pneumatic tire tube. Two examples of such hole stoppers for covering the sharp edges of the spoke access openings are disclosed in U.S. Patent Application Publication No. 2004/0262982 A1 and German Utility Patent No. DE 20 2007 010 082 U1.

In recent years, some wheels have been designed to be used with tubeless tires. The hole stoppers of the above mentioned patent publications cannot completely seal off the spoke access openings. Thus, these hole stoppers are not suitable use for a tubeless wheel. Rather, these tubeless wheels utilize a rim tape to seal the spoke access openings in the outer bridge portion, and thus, prevent air leaks through spoke access openings. One example of a tubeless wheel that uses rim tape is disclosed, in U.S. Patent Application Publication No. 2007/0029869 A1.

SUMMARY

One aspect presented in this disclosure is to provide to a bicycle wheel rim structure that seals off one or more openings in the outer bride portion such that the rim can be used with a tubeless tire.

Yet another aspect presented in this disclosure is to provide a bicycle rim having a bicycle wheel rim structure with a seal arrangement that is relatively simple and inexpensive to manufacture and assemble.

In view of the state of the known technology, a bicycle wheel rim structure is provided that comprises a rim, a cap and a tape. The rim includes a first annular side portion, a second annular side portion and an annular bride portion extending between the first and second annular side portions. The bridge portion has at least one opening. The cap includes a base plate and a projection. The base plate overlies an outer rim surface of the annular bride portion. The projection extends from the base plate into the at least one opening. The tape is attached to the outer rim surface of the annular bridge portion and overlying the base plate of the cap. The tape is dimensioned to cover an interface between a peripheral edge of the base plate of the cap and the outer rim surface of the annular bridge portion.

BRIEF DESCRIPTION OF THE DRAWINGS

Referring now to the attached drawings which form apart of this original disclosure:

FIG. 4 is a partial perspective view of the bicycle wheel rim stricture illustrated in FIGS. 1 to 3, with the tire removed;

FIG. 5 is a partial perspective view of the bicycle wheel rim structure illustrated in FIG. 4, with the tape removed to better illustrated two of the caps;

FIG. 6 is an enlarged end elevational view of one of the caps of the bicycle wheel rim structure illustrated in FIGS. 1 to 4;

FIG. 7 is an enlarged side elevational view of the cap of illustrated in FIG. 6;

FIG. 8 is an enlarged bottom plan view of the cap of illustrated in FIGS. 6 and 7;

FIG. 11 is a partial perspective view of a bicycle wheel rim structure in accordance with a second illustrated embodiment.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
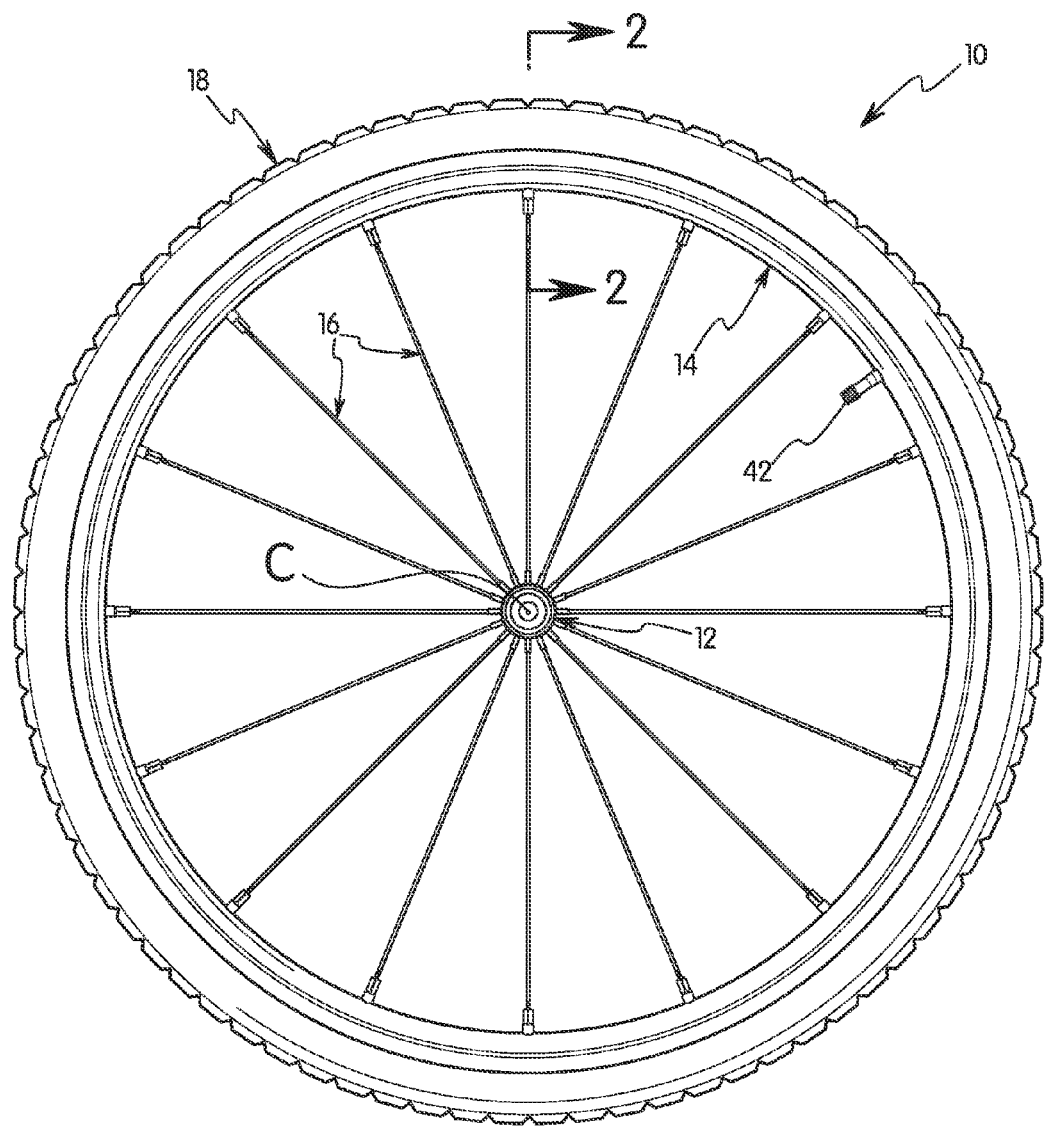
FIG. 1 is a side elevational view of a front bicycle wheel that includes a bicycle wheel rim structure in accordance with a first illustrated embodiment.

Referring initially to FIG. 1, a tensioned spoke bicycle wheel 10 is illustrated in accordance with a first illustrated embodiment. The bicycle wheel 10 basically includes a center hub 12, a bicycle rim 14, a plurality of spokes 16 and a tubeless pneumatic tire 18. The hub 12 is connected to the rim 14 by the spokes 16, which are placed under tension. The tubeless pneumatic tire 18 is attached to the outer periphery of the rim 14. Thus, the bicycle wheel 10 rotates about a center rotational axis C of the hub 12. The hub 12, the rim 14, the spokes 16 and the tubeless pneumatic tire 18 are conventional parts, and thus, the hub 12, the rim 14, the spokes 16 and the tubeless pneumatic tire 18 will only be briefly explained herein. The bicycle wheel 10 is a clincher tire wheel in which that an air tight chamber is formed between the outer surface of the rim 14 and the tubeless pneumatic tire 18.

Figure 2:
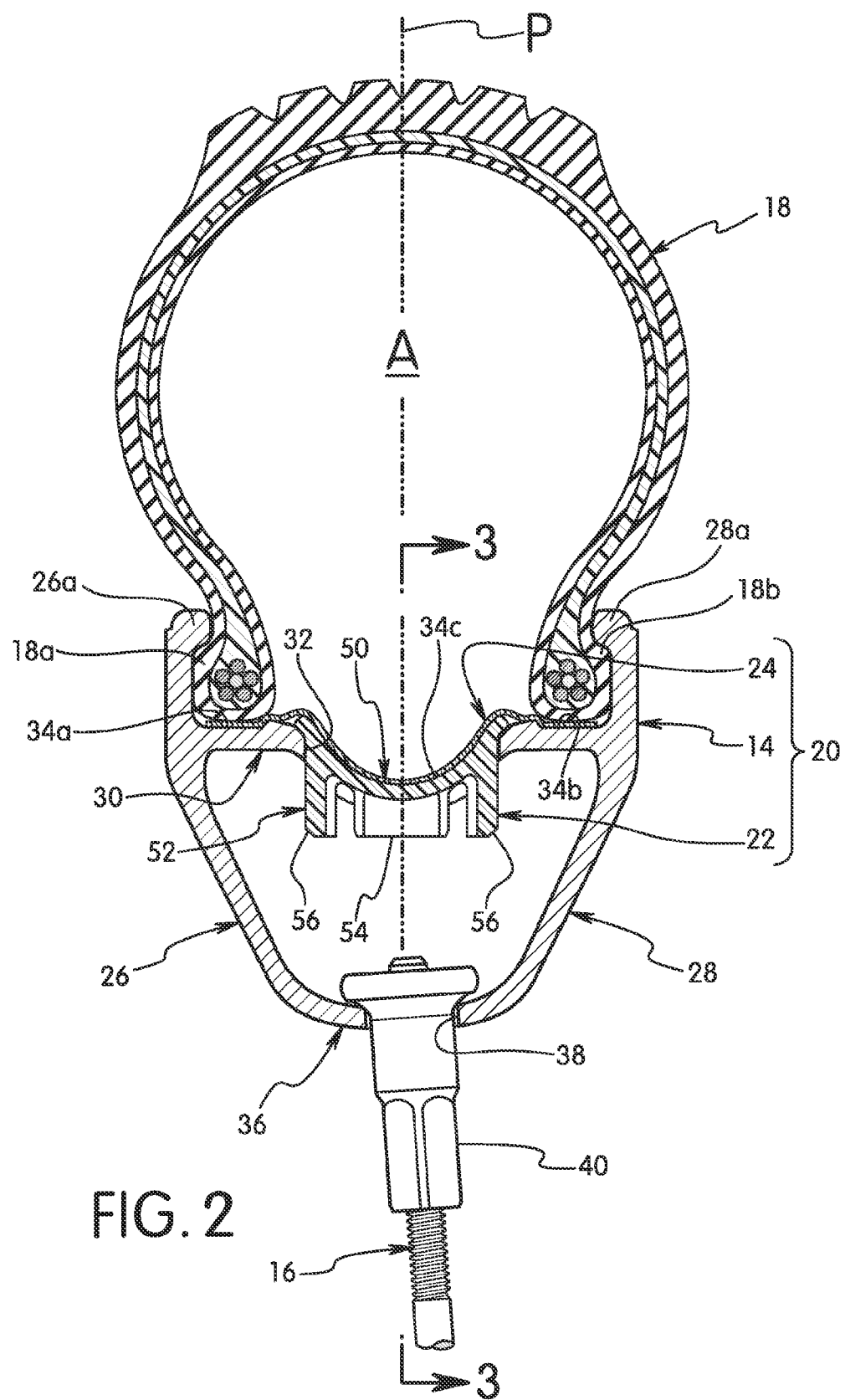
FIG. 2 is an enlarged transverse cross sectional view of a portion of the front bicycle wheel illustrated in FIG. 1 as seen along section line 2-2 in FIG. 1.

Referring now to FIG. 2, a bicycle wheel rim structure 20 is basically formed by the rim 14 being used in conjunction with a plurality of caps 22 and a tape 24 to provide a sealed hollow area A between the rim 14 and the tubeless pneumatic tire 18. More specifically, the rim 14 basically includes a first annular side portion 26, a second annular side portion 28 and an annular bridge portion 30. The annular bridge portion 30 extends between the first and second annular side portions 26 and 28. The annular bridge portion 30 has a plurality of spoke access openings 32 for installing the spokes 16. The caps 22 are inserted into the spoke access openings 32 of the annular bridge portion 30 and the tape 24 is applied over the caps 22 and an outer rim surface 34 of the annular bridge portion 30. The caps 22 are identically shaped in the illustrated embodiment. However, the caps 22 can be differently configured as needed and/or desired. Moreover, in certain circumstances such as where a rim has only one opening in the annular bridge portion, only a single cap 22 may be used with a rim.

In the illustrated embodiment, the rim 14 is symmetrically shaped relative to a center plane P passing through the center of the annular bridge portion 30. The rim 14 is constructed of a lightweight rigid material. For example, the rim 14 can be constructed of any suitable metallic material such as plated steel, stainless steel, aluminum, magnesium, titanium, or other suitable metallic alloys (especially those known in the art) as well as other non-metallic materials, such as a carbon fiber composite. The rim 14 is preferably constructed using conventional manufacturing techniques. For example, the rim 14 can be constructed by first extruding a length of material having the cross-sectional shape illustrated in FIG. 2, bending the length of material into an annular shape, and then attaching the ends of the bent length of material together by welding or the like to form the rim 14.

Figure 3:
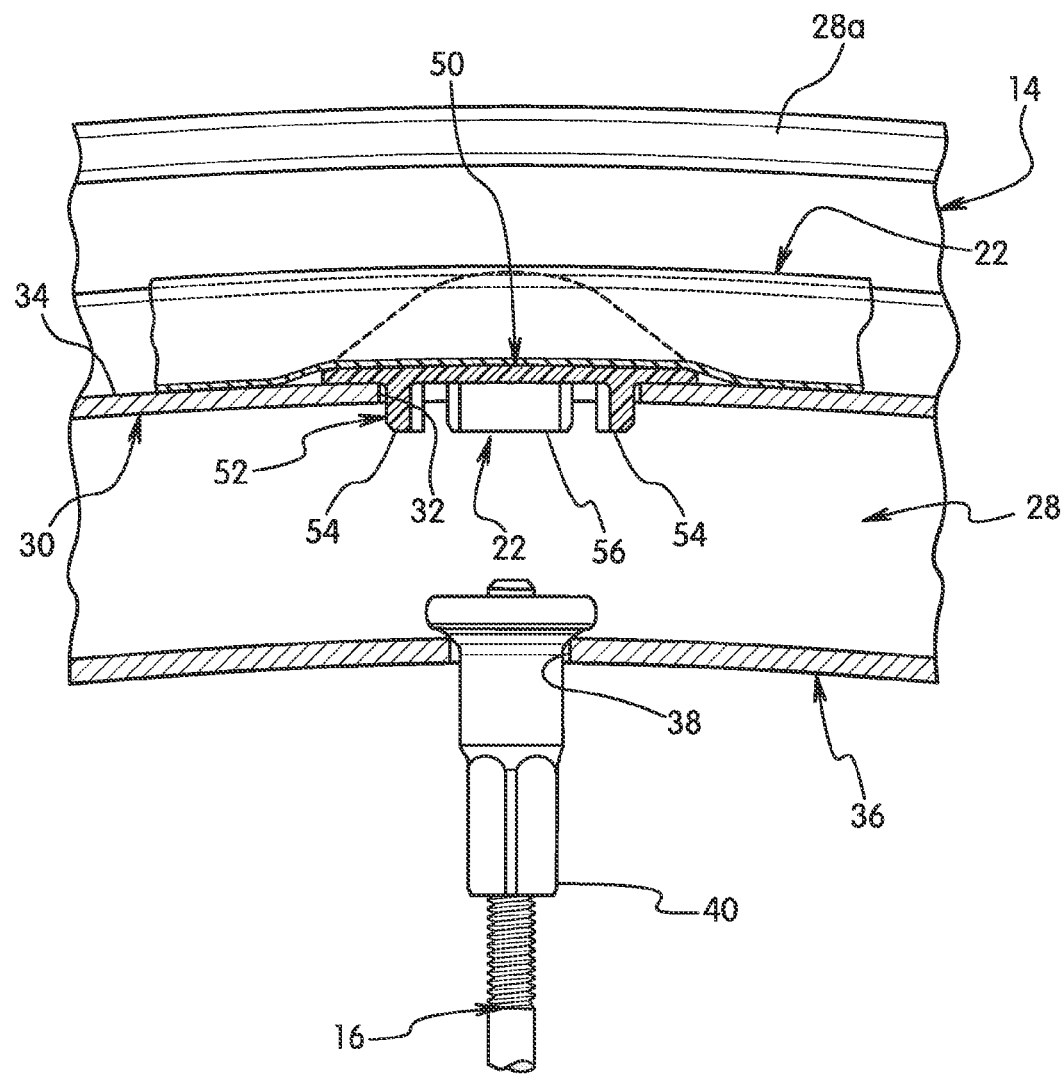
FIG. 3 is a partial circumferential cross sectional view of a portion of the front bicycle wheel illustrated in FIG. 1 as seen along section line 3-3 in FIG. 2 with the tire removed.
Figure 9:
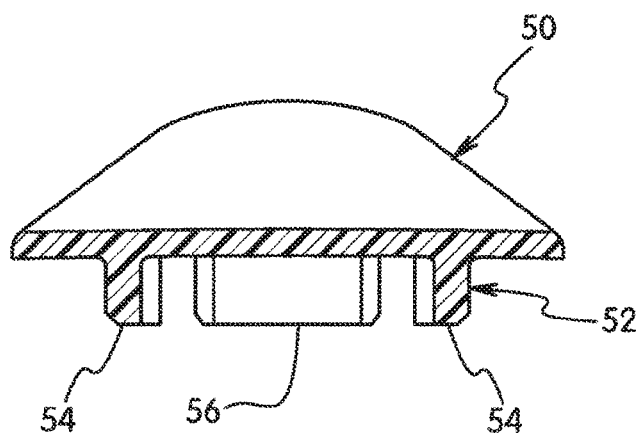
FIG. 9 is a circumferential cross sectional view of the cap of illustrated in FIGS. 6 to 8 as seen along section line 9-9 in FIG. 6.
Figure 10:
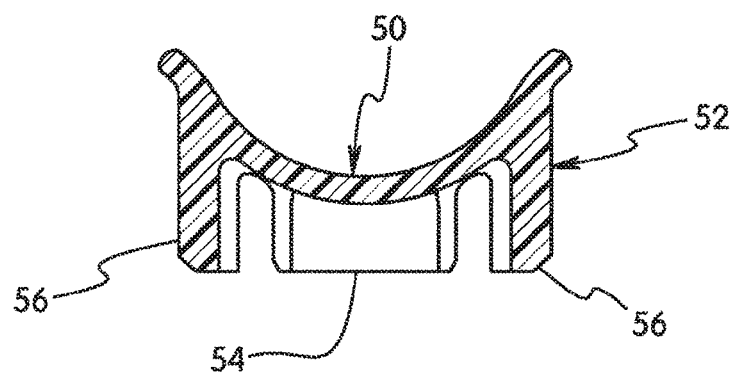
FIG. 10 is a transverse cross sectional view of the cap of illustrated in FIGS. 6 to 9 as seen along section line 10-10 in FIG. 7.

As seen in FIGS. 2 and 3, the rim 14 further includes a spoke attachment portion 36 that extends between the first and second annular side portions 26 and 28. The spoke attachment portion 36 includes a plurality of spoke attachment openings 38 for attaching the outer ends of the spokes 16 using spoke nipples 40. Also the first annular side portion 26 includes a first tire retaining rib 26a, while the second annular side portion 28 includes a second tire retaining rib 28a. The first and second tire retaining ribs 26a and 28a are configured and arranged to retain first and second annular beads 18a and 18b of the tubeless pneumatic tire 18 against the annular bridge portion 30. In particular, in the illustrated embodiment, the annular bridge portion 30 is an undulated tubular member such that the outer rim surface 34 includes a first annular tire support surface 34a, a second annular tire support surface 34b and a recessed center surface 34c. The recessed center surface 34e is arranged between the first and second tire support surfaces 34a and 34b. The recessed center surface 34c is a concaved surface that forms an annular recess that receives the caps 22. The first and second tire support surfaces 34a and 34b contact the first and second annular beads 18a and 18b of the tubeless pneumatic tire 18 to create a seal therebetween.

In the illustrated embodiment, the first and second annular side portions 26 and 28, the annular bridge portion 30 and the spoke attachment portion 36 are formed as a one-piece, unitary member from as suitable metal such as an aluminum alloy. However, as mentioned above, the rim 14 can be made of several pieces and of a variety of materials. The spoke mounting part 22 extends from the annular tire mounting part 20 to define an interior space with a predetermined interior shape. Each of the annular bridge portion 30 and the spoke attachment portion 36 has a single air valve mounting opening (not shown) for attaching an air filler valve 42 (Sec FIG. 1) in a conventional manner. The air filler valve 42 can extend through an opening in the ape 24 or the tape 24 can be omitted in the area of the air filler valve 42 as needed and/or desired.

In the illustrated embodiment, the tape 24 extends continuously thr at least 360 degrees in a circumferential direction of the outer rim surface 34 of the annular bridge portion 30. However, the tape 24 does not need to extend continuously for at least 360 degrees to cover all of the caps 22 in the annular bridge portion 30. For example, a single piece of tape that extends continuously at least 340 degrees in the circumferential direction of the outer rim surface 34 of the annular bridge portion 30 can be used to cover all of the caps 22 installed in the annular bridge portion 30. Also depending on the number and arrangement of the spokes of the rim (e.g., a sixteen paired spoke rim), a single piece of tape that extends continuously about 320 degrees can all of the caps. Also, alternatively, as discussed below, several individual pieces of the tape 24 can be provided with a circumferential length such that covers two or more of the caps 22 in the annular bridge portion 30.

Referring now to FIGS. 6 to 10, the caps 22 will now be discussed in more detail. While only one of the caps 22 is illustrated in FIGS. 6 to 10, the other or additional caps 22 have the same construction. Since all of the caps 22 are identical, only one cap will be illustrated herein. Each of the caps 22 includes a base plate 50 and a projection 52. The base plate 50 and the projection 52 are integrally formed as a one-piece, unitary member for each of the caps 22. The caps 22 are preferably formed of a plastic or an elastomeric material. As seen in FIG. 8, the base plate 50 has an elliptical shape as view in plan along a radial direction of the rim 14.

The base plate 50 is dimensioned such that base plate 50 overlies the outer rim surface 34 of the annular bridge portion 30 to completely cover the corresponding one of the spoke access openings 32. The base plate 50 of the cap 22 has a complementary contour that mates with a portion of the outer rim surface 34 of the annular bridge portion 30 that surrounds the spoke access openings 32 in the annular bridge portion 30. In the illustrated embodiment, the recessed center surface 34c is a concaved surface that forms an annular recess that receives the base plate 50 of the caps 22. Thus, in the illustrated embodiment, the base plate 50 of the cap 22 is laterally curved to mate with a lateral curvature of the annular recess of the recessed center surface 34c as seen in FIG. 2. Moreover, the base plate 50 of the cap 22 is longitudinally curved to mate with a circumferential curvature of the annular recess of the recessed center surface 34c as seen in FIG. 3.

As seen in FIGS. 2 and 3, the projection 52 extends from the base plate 50 into a corresponding one of the spoke access openings 32. In the illustrated embodiment, the projection 52 includes a plurality of protrusions 54 and 56 extending from a lower surface of the base plate 50. The protrusions 54 and 56 are arc shaped segments or flanges having outer curved surfaces that substantially match the curvature of the spoke access openings 32. The protrusions 56 are each provided with a rib 56a. Each of the ribs 56a preferably has a substantially semi-circular cylinder shape for engaging the peripheral edge of one of the spoke access openings 32.

The tape 24 is attached to the outer rim surface 34 of the annular bridge portion 30 and completely overlies the base plate 50 of the cap 22. The ribs 56a of the protrusions 56 and the spoke access openings 32 are dimensioned relative to each other such that the cap 22 is retained in the spoke access openings 32 in the annular bridge portion 30. In particular, the ribs 56a of the protrusions 56 and the spoke access openings 32 are dimensioned relative to each other such that by the ribs 56a of the protrusions 56 apply a force against the annular bridge portion 30 due to deformation (e.g., inward deflection) of the protrusions 56. In other words, the ribs 56a of the protrusions 54 interfere with the peripheral edge of the spoke access opening 32 during insertion of the cap 22 into the spoke access openings 32 such that the protrusions 56 are deflected inward towards the center of the spoke access opening 32. Alternatively, the ribs 56a of the protrusions 56 can elastically or plastically deform, depending on the material of the cap 22, to retain the cap 22 in the spoke access opening 32. Also alternatively, the ribs 56a of the protrusions 56 can be eliminated and the protrusions 54 and/or 56 can each be configured with an abutment for creating a snap-fit with the peripheral edge of the spoke access opening 32.

The tape 24 is dimensioned to cover and seal an interface between a peripheral edge of the base plate 50 of the cap 22 and the outer rim surface 34 of the annular bridge portion 30. Preferably, the tape 24 has a lateral width such that the tape 24 at least partially extends over the first and second tire support surfaces 34a and 34b ad seen in FIGS. 2 and 4. The tape 24 can be, for example, an adhesive tape such as Scotch® brand 5901 adhesive tape. Thus, in the illustrated embodiment, the tape 24 is adhesively secured to all of the caps 22 and the outer rim surface 34 of the annular bridge portion 30. Of course, other types of tapes can be used for the tape 24 as needed and/or desired.

Referring now to FIG. 11, a partial perspective view of a bicycle wheel rim structure 20A is illustrated in accordance with a second embodiment. The bicycle wheel rim structure 20A is identical to the bicycle wheel rim structure 20 of the first embodiment, except that the bicycle wheel rim structure 20A uses a separate piece of tape 24A for each of the spoke access openings 32 in the annular bridge portion 30 of the rim 14. Thus, in this illustrated embodiment, the rim 14 uses sixteen pieces of the tape 24A that overlie the caps 22 in the spoke access openings 32 of the annular bridge portion 30. Each of the pieces of the tape 24A extends continuously at least ten degrees in the circumferential direction of the outer rim surface 34 of the annular bridge portion 30. Since the bicycle wheel rim structure 20A uses the rim 14 and the caps 22 of the first embodiment, the descriptions of the rim 14 and the caps 22 will not be repeated. Also, since the pieces of tape 24A are identical to the tape 24 of the first embodiment, except for the circumferential dimension, the description of the pieces of tape 24A will not be discussed in further detail herein.

Of course, the number of pieces of the tape 24A will depend on the particular rim. For example, in the case of a sixteen spoke rim that has paired spokes, only eight pieces of tape 24A would be need. However, each of the pieces of the tape 24A can be longer to cover two or more of the caps 22 in the annular bridge portion 30 if needed and/or desired. Thus, the circumferential length of the tape 24 or 24A can be varied in size depend on the particular rim and/or as needed.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part." "section," "portion." "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle wheel rim structure on a level surface. Accordingly, these terms, as utilized to describe the bicycle wheel rim structure should be interpreted, relative to a bicycle equipped with the bicycle wheel rim structure as used in the normal riding position on a level surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle wheel rim structure comprising:
a rim including a first annular side portion, a second annular side portion and an annular bridge portion extending between the first and second annular side portions, the bridge portion having at least one opening;
a cap including a base plate overlying an outer rim surface of the annular bridge portion, and a projection that extends from the base plate into the at least one opening, the projection including a plurality of protrusions extending from a lower surface of the base plate, at least one protrusion of the plurality of protrusions includes a rib extending from a surface of the at least one protrusion, the protrusions and the at least one opening in the annular bridge portion being dimensioned relative to each other such that the cap is retained in the at least one opening in the annular bridge portion by at least one of the protrusions applying a force against the annular bridge portion due to deformation of the at least one of the protrusions; and
a tape attached to the outer rim surface of the annular bridge portion and overlying the base plate of the cap, the tape being dimensioned to cover an interface between a peripheral edge of the base plate of the cap and the outer rim surface of the annular bridge portion.

2. The bicycle wheel rim structure according to claim 1, wherein
the outer rim surface of the annular bridge portion includes a first annular tire support surface, a second annular tire support surface and a recessed center surface arranged between the first and second tire support surfaces to form an annular recess that receives the base plate of the cap.

3. The bicycle wheel rim structure according to claim 2, wherein
the tape has a lateral width such that the tape at least partially extends over the first and second tire support surfaces.

4. The bicycle wheel rim structure according to claim 2, wherein
the base plate of the cap is laterally curved to mate with a lateral curvature of the annular recess of the recessed center surface.

5. The bicycle wheel rim structure according to claim 1, wherein
the base plate of the cap has a complementary contour that mates with a portion of the outer rim surface of the annular bridge portion that surrounds the at least one opening in the annular bridge portion.

6. The bicycle wheel rim structure according to claim 1, wherein
the base plate and the projection are integrally formed as a one-piece, unitary member.

7. The bicycle wheel rim structure according to claim 1, wherein
the base plate has an elliptical shape as view in plan along a radial direction of the rim.

8. The bicycle wheel rim structure according to claim 1, further comprising
a plurality of additional caps, and
the at least one opening including a plurality of spoke access openings in the bridge portion, each of the spoke access openings being provided with one of the cap and the additional caps.

9. The bicycle wheel rim structure according to claim 8, wherein
the additional caps and the cap are identically shaped.

10. The bicycle wheel rim structure according to claim 8, wherein
the tape extends continuously at least ten degrees in a circumferential direction of the outer rim surface of the annular bridge portion.

11. The bicycle wheel rim structure according to claim 8, wherein
the tape extends continuously at least 360 degrees in a circumferential direction of the outer rim surface of the annular bridge portion.

12. The bicycle wheel rim structure according to claim 1, wherein
the tape seals an interface between a peripheral edge of the base plate of the cap and the outer rim surface of the annular bridge portion.

13. The bicycle wheel rim structure according to claim 1, wherein the rib is configured to apply a force against the annular bridge portion due to deformation of the protrusion.

14. The bicycle wheel rim structure according to claim 13, wherein
the rib has a substantially semi-circular cylinder shape.

* * * * *